US009881084B1

(12) United States Patent
Robertson et al.

(10) Patent No.: US 9,881,084 B1
(45) Date of Patent: Jan. 30, 2018

(54) IMAGE MATCH BASED VIDEO SEARCH

(71) Applicant: A9.com, Inc., Palo Alto, CA (US)

(72) Inventors: Scott Paul Robertson, Mountain View, CA (US); Sunil Ramesh, San Jose, CA (US)

(73) Assignee: a9.com, Inc., Palo Alto, CA (US)

( * ) Notice: Subject to any disclaimer, the term of this patent is extended or adjusted under 35 U.S.C. 154(b) by 728 days.

(21) Appl. No.: 14/313,577

(22) Filed: Jun. 24, 2014

(51) Int. Cl.
*G06F 17/30* (2006.01)

(52) U.S. Cl.
CPC .............................. *G06F 17/30781* (2013.01)

(58) Field of Classification Search
CPC .. G06F 17/30867; G06F 17/211; G06F 21/32; G06F 17/30026; G06F 17/30041; G06F 17/30047; G06F 17/30424; G06F 17/2288; G06F 17/30038
See application file for complete search history.

(56) References Cited

U.S. PATENT DOCUMENTS

| 6,928,233 B1* | 8/2005 | Walker | G06F 17/30787 |
| | | | 348/700 |
| 8,028,314 B1* | 9/2011 | Sezan | G06F 17/30828 |
| | | | 709/223 |
| 9,323,841 B2* | 4/2016 | Pereira | G06F 17/30858 |
| 2012/0039539 A1* | 2/2012 | Boiman | G11B 27/28 |
| | | | 382/195 |
| 2012/0207387 A1* | 8/2012 | Pereira | G06F 17/30858 |
| | | | 382/168 |
| 2013/0091409 A1* | 4/2013 | Jeffery | G06F 17/30056 |
| | | | 715/202 |
| 2014/0157306 A1* | 6/2014 | Deo | H04N 21/4788 |
| | | | 725/34 |
| 2014/0280555 A1* | 9/2014 | Tapia | G06Q 50/01 |
| | | | 709/204 |

\* cited by examiner

*Primary Examiner* — Angelica Ruiz
(74) *Attorney, Agent, or Firm* — Hogan Lovells US LLP

(57) ABSTRACT

Various embodiments may obtain an image representation of an object for use in image matching and content retrieval. For example, an image matching system processes video content items to determine one or more scenes for one or more video content items. The image matching system can extract, from at least one video frame for a scene, feature descriptors relating to one or more objects represented in the at least one video frame. The image matching system indexes the feature descriptors into a feature index storing information for each of the feature descriptors and respective corresponding video frame. The image matching system correlates the feature descriptors of the feature index to determine one or more groups having similar feature descriptors. The image matching system indexes the one or more groups into a correlation index storing information for each of the one or more groups and respective corresponding feature descriptors.

19 Claims, 11 Drawing Sheets

IMAGE MATCH BASED VIDEO SEARCH

BACKGROUND

Users are increasingly utilizing electronic devices to obtain various types of information. For example, a user wanting to watch a movie might access a video streaming service in order to search the types of movies offered through that service. Unless the user knows an exact movie or genre of movie that the user wants, however, the user might have to search through hundreds or thousands of different movies using various options to attempt to locate the type of movie in which the user is interested.

Discovery of video content is increasingly posing challenges for service providers of video streaming services. Users spend increasing amounts of time searching through a service provider's database for video content using conventional approaches such as text entry and/or pane navigation (e.g., scrolling through panes). Service providers attempt to find additional video content for a user to watch in order to help keep the customer engaged with the video streaming service and to keep the customer subscribed to the video streaming service. As video streaming services become more widely used and as products provided by the video streaming services increase, the complexity of searching for video content items is increasing.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to searching for video content. In particular, various embodiments may obtain an image representation of an object for use in image matching and content retrieval. For example, an image matching system processes video content items to determine one or more scenes for one or more video content items. The image matching system can extract, from at least one video frame for a scene, feature descriptors relating to one or more objects represented in the at least one video frame. The image matching system indexes the feature descriptors into a feature index storing information for each of the feature descriptors and respective corresponding video frame. The image matching system correlates the feature descriptors of the feature index to determine one or more groups having similar feature descriptors. The image matching system indexes the one or more groups into a correlation index storing information for each of the one or more groups and respective corresponding feature descriptors. A query image from a client computing device can be matched against at least a subset of the correlation index to determine a matching video content item having spatial and temporal consistency.

The terms "computing device," "client device" and "mobile device" are used interchangeably herein to refer to any one or all of servers, personal computers, smartphones, cellular telephones, tablet computers, laptop computers, netbooks, ultrabooks, palm-top computers, personal data assistants (PDA's), wireless electronic mail receivers, multimedia Internet enabled cellular telephones, Global Positioning System (GPS) receivers, wireless gaming controllers, and similar personal electronic devices which include a programmable processor.

Figure 1A:
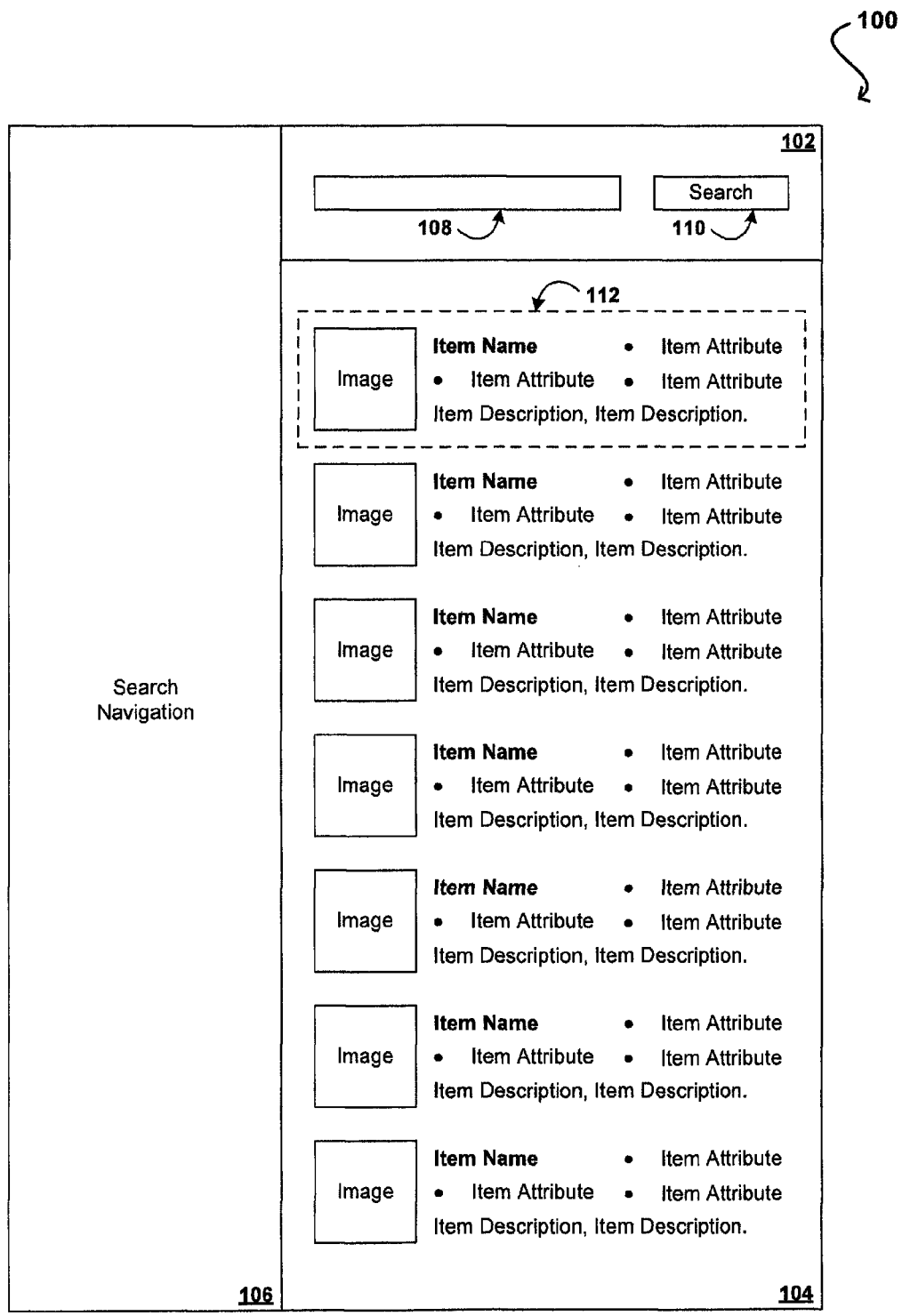
FIGS. 1A-B illustrate examples of a user searching for video content with a computing device, according to certain aspects of the subject technology.

FIG. 1A is a schematic diagram depicting aspects of an example user interface 100 for searching video content items in an video streaming service. The user interface 100 may include graphical user interface (GUI) components such as a search input component 102, a search result component 104 and a search navigation component 106. The user interface 100 may incorporate any suitable user interface (UI) component. Examples of suitable user interface components include, but are not limited to, components configured to cause, monitor, alter and/or suppress a human perception and/or a human sensory event including visual perceptions, auditory perceptions, tactile perceptions and kinesthetic perceptions. For example, the user interface 100 may be presented to a user by a portable computing device 156 of FIG. 1B.

The search input component 102 may include a text input component 108 and a search submission component 110. The search result component 104 may include search result presentations such as the search result presentation 112. The search navigation component 106 may include menu items for navigating through the video streaming service. The search input component 102, the search result component 104 and the search navigation component 106 may be visually differentiated, for example, by a displayed location, a visual grouping and/or one or more explicit elements of visual separation and/or differentiation. In the example user interface 100, visual presentation areas associated with the search input component 102, the search result component 104 and the search navigation component 106 are contiguous. For example, aspects of the search navigation component 106 may be incorporated into the visual presentation area associated with the search result component 104.

The user of the user interface 100 may input text with the text input component 108. The text input may be any suitable text. Example of suitable text include one or more strings of alphanumeric characters, one or more strings of symbols such as symbols corresponding to keys of a keyboard, words of a language such as English, and suitable combinations thereof. The text input may correspond to one or more search terms.

The search results presented by the search result component 104 may correspond to one or more search terms input with the text input component 108. For example, the search result presentation 112 may include a name of a video content item (Item Name), one or more attributes of the video content item (Item Attribute), an image for the video content item (Image) and a description of the video content item (Item Description). FIG. 1A depicts each of the search results presented by the search result component 104 as having a similar presentation format but may include varying presentation formats depending on implementation.

The name of the video content item may be any suitable item identifier. For example, the name may include one or more strings of symbols such as alphanumeric characters and/or words of a language such as a natural language. Presented attributes of the item may be selected from a suitable set of item attributes. Suitability of a particular attribute for presentation may depend on a type of the item, a context of the search, a purpose of the user interface 100 and/or a theme of the user interface 100. For example, the item may be a representation of an online video stream, and suitable item attributes may include one or more actors, a release date, one or more video statistics including length of movie, and parental guidance rating (e.g., G, PG, PG-13, R, TV-MA, etc.). As another example, the search may have a commercial context, and suitable item attributes may include one or more availability specifications including a number of related episodes if a television program, one or more related categories of movies and/or programs, one or more prices and/or price components including base price, taxes and delivery costs, one or more popularity scores, one or more consumer review ratings, and one or more related service providers. The description of the item may include a summary of the item in any suitable text including hypertext links to an external website for additional information related to the item.

In some aspects, the search result component 104 may include search result presentations where the user of the user interface 100 can navigate through the search result component 104 using a touch gesture (e.g., drag gesture, swiping gesture) to locate one or more items of interest to the user. In this respect, the user can select the items by tapping on the image corresponding to the desired item.

The drawback with the user interface 100 is that a user can spend a significant amount of time and effort locating a movie within a database that contains hundreds, if not thousands, of movies. As such, the user interface 100 limits the user to a video search based on a text-based search query and/or scrolling through items presented by the video streaming service. However, the video search can become significantly cumbersome to the user who may not identify movies that feature certain desirable objects, locations and/or people when the video search is limited to a title query and/or genre query.

To aid in discovery of movies or television programs to watch on a video streaming service, searches may be performed based on a visual input from a camera of a computing device using image match technologies. Discovering new content is a problem that many users have with video streaming services. An image match driven search may be implemented for many scenarios including, but not limited to, locations, landmarks, people, products, etc. A user may want to see movies featuring a certain type of car, a movie featuring people who look similar to the user, a movie where people use a certain phone, or a movie that takes place in a certain location.

Figure 1B:
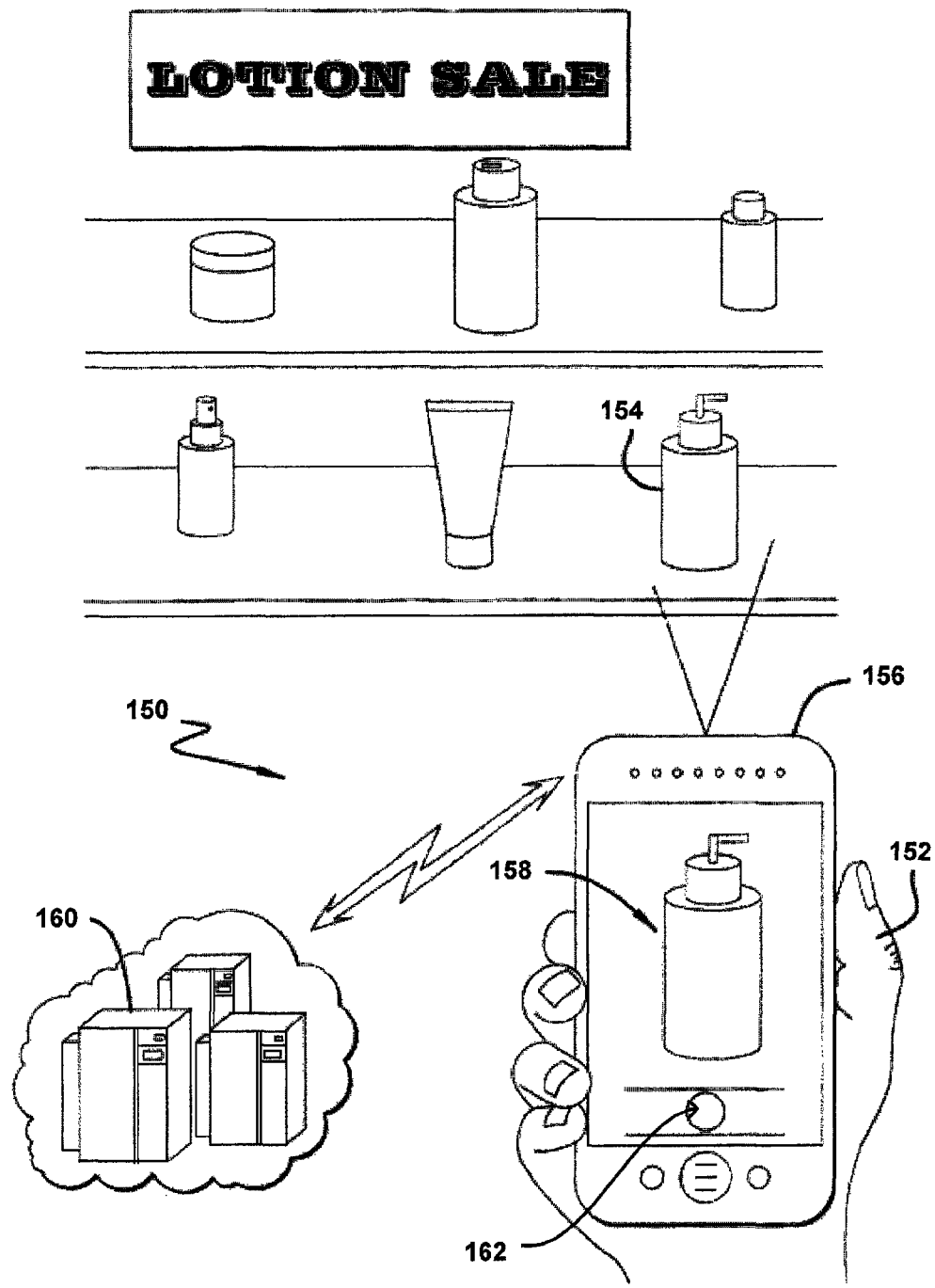

FIG. 1B illustrates example situation 150 wherein user 152 is interacting with computing device 156. Although a portable computing device (e.g., a smart phone, an e-book reader, or tablet computer) is shown, it should be understood that various other types of electronic devices that are capable of determining and processing input can be used in accordance with various embodiments discussed herein. These devices can include, for example, desktop computers, notebook computers, personal data assistants, cellular phones, video gaming consoles or controllers, smart televisions, a wearable computer (e.g., a smart watch or glasses), and portable media players, among others.

In FIG. 1B, computing device 156 has at least one image capture element, such as a camera or camera sensor, operable to perform functions such as image and/or video capture. Each image capture element may be, for example, a charge-coupled device (CCD), a motion detection sensor, or an infrared sensor, or can utilize another appropriate image capturing technology. In this example, the user 152 is interested in obtaining information about video content items (e.g., movies) that feature item 154 which, in this example, is a bottle of lotion located in a store. In order to obtain this information, the user 152 can position computing device 156 such that at least the relevant portion of item 154 is within a field of view of at least one camera of the computing device 156. The resulting image 158 can then be displayed on a display screen of the computing device 156. Image 158 can be a still image that was captured by the camera, or can be a frame of a "live" view as captured by a video mode of the camera, etc. In an aspect, the user 152 causes image 158 to be captured in response to the user 152 pressing (or touching) a search button 162 rendered on the display screen. In turn, the image 158 is uploaded to server 160 of, for example, an image matching service and, therefore, capable of running one or more image analysis or object recognition algorithms to attempt to recognize item 154 within image 158.

In an aspect, the user 152 could take an image of a landmark, e.g., the Golden Gate Bridge located in California, and then request to see movies featuring the California landmark. Image matching can be used to find movies or television programs that feature the Golden Gate Bridge in them, and return that list to the user 152. The image matching for video search can be performed for products, faces, and other objects.

Image matching is a technique being used in computer vision, object recognition, motion tracking, three-dimensional (3D) modeling, and the like, which can be performed to check whether two images contain the same content. For example, a user interested in determining availability of a movie in a video streaming service can capture an image of a book represented in the movie and submit that image to an image matching service as a query image in order to be provided with information associated with the movie containing a scene depicting the book in return. In order to accomplish this, features of the query image can be transformed into feature descriptors and compared to feature descriptors of images of books, in this example, stored with the image matching service. Once a corresponding match is identified, information associated with the matching image (e.g., information for searching the movie) can be provided and displayed to the user on their computing device.

Image computational processing such as higher level machine vision processing performed by a device processor (e.g., digital signal processor (DSP)) can include gesture tracking, head/face tracking, object tracking, face/object recognition, multiple image stereo processing (e.g. image rectification, generating stereo disparity maps), three dimensional image capture, metadata tagging of the image data (e.g., geo-tagging, time-stamping), symbol reading (e.g., barcodes, QR codes), optical character recognition (OCR), one or more image fusion algorithms, sensor fusion algorithms, and the like. Other tasks can include basic level image processing, including additions and subtractions of image data that can be used for object detection, windowing of a detected object, image segmentation, exposure duration determination, ambient light determination, etc. As used herein, machine vision processing can include any process that can be used to analyze an image and extract, deduce or learn information about that image. For example, the device processor can process image data to determine when a user has made a particular hand gesture (e.g., gesture tracking), detect when a specific face is recognized (e.g., face recognition), identify that a barcode has been read and provide the value of the barcode (e.g., symbol reading), or determine other information that can be provided to the device processor and be used to control the user interface of the computing device.

For example, the system can extract features from each of the images using a feature extraction algorithm (e.g., Accumulated Signed Gradient) and transform the extracted features for each image into feature descriptors which can be subsequently stored and used to compare against query images submitted by users or otherwise obtained (e.g., from third party service providers).

Accordingly, upon receiving a query image (e.g., the image 158 submitted by the user 152 via the computing device 156), feature descriptors of features from the query image can be extracted and visual words assigned thereto. The system can take visual words and find correlations amongst those visual words to create a correlation index based on those groups. Each visual word representing the query image can then be compared against groups of visual words stored in the index of visual words by a search engine in a manner similar to that employed by text retrieval techniques. As a result, a group of closest matching index images that at least partially match the query image can be determined based at least in part upon matching visual words.

Various other functions and advantages are described and suggested below as may be provided in accordance with the various embodiments.

Figure 2:
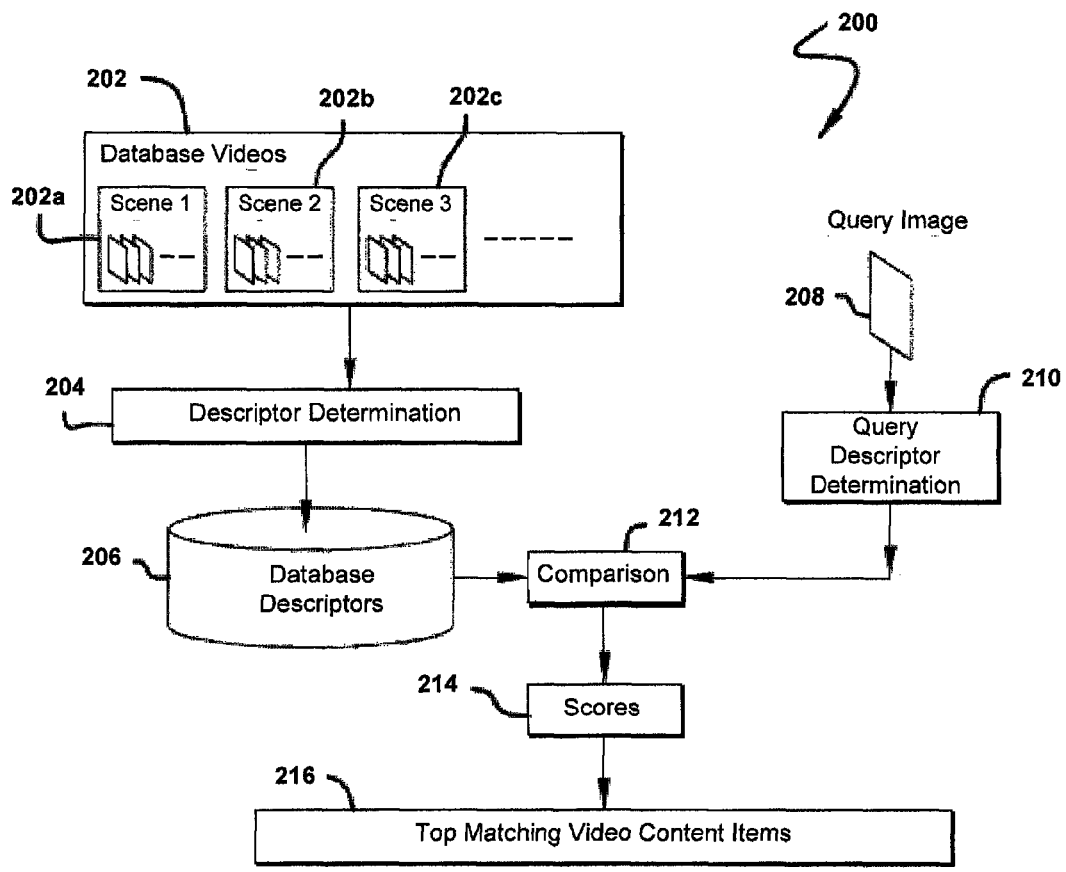
FIG. 2 illustrates an example image match system, according to certain aspects of the subject technology.

FIG. 2 illustrates an example system flow 200 of an exemplary image matching service. It should be understood that, for this and other processes discussed herein, there can be additional, fewer, or alternative steps, performed in similar or alternative steps, or in parallel, within the scope of the various embodiments unless otherwise stated. The exemplary image matching service obtains a database of videos 202 to perform object recognition and video content retrieval. The image matching service will often obtain multiple videos featuring objects of interest in different scenes (202a, 202b, 202c) to be able to match an image of a respective object from more than one scene. In this respect, scene boundaries for each of the videos in the database of videos 202 are first determined. For example, frames corresponding to the start, middle and end of each scene may be obtained. In an aspect, at least one frame corresponding to the middle of each scene is obtained. In some embodiments, a random sample of frames from each scene is obtained.

Typical image matching algorithms take advantage of the fact that an image of an object, frame or scene contains a number of feature points (e.g., specific points in an image that are robust to changes in image rotation, scale, viewpoint or lighting conditions). Accordingly, these feature points will often be present in both of two different images of an object or scene, even if the two images differ. In some aspects, features for each frame corresponding to a scene are obtained.

Feature descriptors describing each of at least a subset of features of each scene are determined to create a first index of feature descriptors for each database video 202. In order to determine the feature descriptors, feature points in at least one frame corresponding to the scene are first identified. The feature descriptors in the first index are correlated amongst each other to create a second index of correlated descriptors based on one or more groups having similar (or matching) features. In this respect, the correlated index includes computer vision defined groups. For example, a single movie can relate to multiple groups based on the different types of features included in the movie that correspond to one or more groupings.

Accordingly, the correlated descriptors for each of the database videos 202 are stored in descriptor database 206 and used to compare against query images submitted by users. In some aspects, users can manually label each of the groups belonging to the descriptor database 206 to allow the users to search based on a text-entry related search, or to create user searchable categories based at least in part upon the user-provided labels.

In some embodiments, the image matching service can be configured to support more abstract groupings of videos. For example, the descriptor determination 204 can include functionality to analyze a color palette, lighting, audio fingerprint, and other elements of the video while processing the videos. In this respect, the image matching service can be based on groupings that are not solely object driven but rather based on groupings with a common color scheme, audio fingerprint or other related aspects. In an aspect, the color palette for one of the database videos 202 is analyzed to have categorizations of videos that have certain color schemes, e.g., a movie scene with blue tint, or one or more movie frames with orange saturation.

Upon obtaining query image 208 from a user, query feature descriptors for features presented in image 208 are determined 210, and these query feature descriptors are compared 212 against the correlated descriptors stored in descriptor database 206. As a result, matching scores 214 are determined and returned for each of database videos 202 with respect to query image 208. In this example, each of the matching scores represents a confidence for how well a respective group of images matches the query image 208. The grouping with the highest matching score is identified as a match and images associated with the matching group (e.g., movies featuring an object in query image 208) can be provided and displayed to the user on their computing device.

Figure 3:
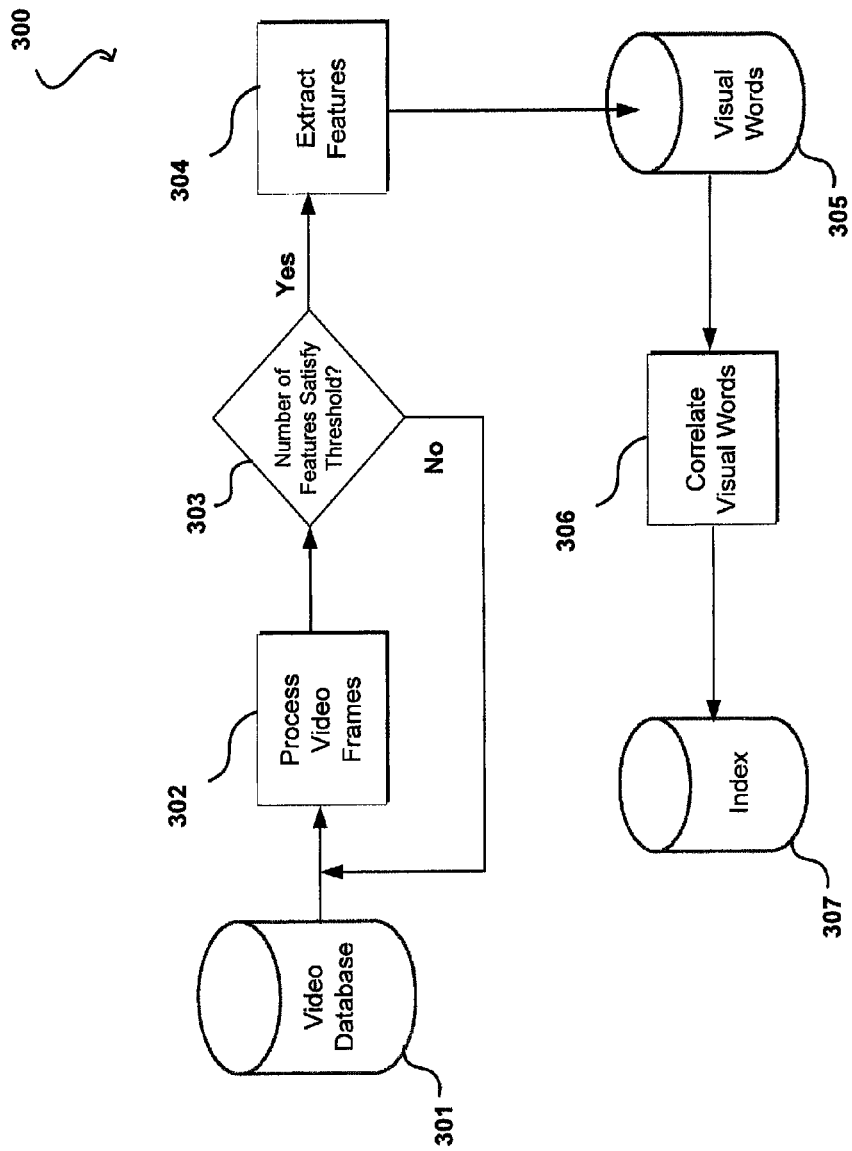
FIG. 3 illustrates an example pre-processing through a system, according to certain aspects of the subject technology.

FIG. 3 illustrates an example preprocessing system flow 300 of an image matching system in accordance with at least one embodiment. It should be understood that, for this and other processes discussed herein, there can be additional, fewer, or alternative steps, performed in similar or alternative steps, or in parallel, within the scope of the various embodiments unless otherwise stated. In this example, video database 301 contains sets of video frames of video content items. First, the image matching system processes each of the video content items contained in the video database 301. The image matching system determines scene boundaries for a given video content item (e.g., sparse sampling). For example, the image matching system analyzes the video at the start, middle and end of every scene in the video content item. In this respect, processing item can be substantially reduced as opposed to analyzing each frame for every scene in the video. In some aspects, the image matching system analyzes one frame from the middle of every scene in the video. In turn, for each frame that is processed, the image matching system may determine whether the frame has enough interesting data that would be useable by the image matching system. In this respect, the image matching system looks for image frames containing interest points or corners that are easily identifiable by the feature extraction algorithms. For example, if there is a scene in a big dark room, and there is insufficient lighting, the image matching system can briefly analyze the frame and move on (e.g., the frame is not sent for further processing).

In step 303, if the number of features determined to be present in the frame satisfies a specified threshold, the image matching system proceeds to extract those determined features. In some aspects, the specified threshold is a hardcoded value associated with a corresponding feature extraction algorithm used. Otherwise, the image matching system returns to the beginning of step 302 to process the next video frames. In step 304, feature descriptors are extracted from each scene contained in or added to video database 301, as discussed above. In an aspect, the image matching system processes each video using dense sampling. In this example, specified points are placed on an image, and features around those placed points are extracted. As such, the dense sampling may be performed irrespective of the strength of the features (with respect to the specified threshold). The feature descriptors may be extracted using a feature extraction algorithm, such as Accumulated Signed Gradient (ASG), a Scale-Invariant Feature Transform (SIFT) algorithm, Harris corner detection algorithm, or the like.

The feature descriptors can be assigned to visual words or mapped to each of their own respective closest visual word. The visual words are stored in visual word database 305 that can be used to look up a visual word for a corresponding set of video frames (or scene). Each visual word may represent a small portion of a video by carrying some kind of information related to its respective representative feature (e.g., color, shape, texture, etc.), or changes occurring in pixels contained in the set of video frames such as the filtering, low-level feature descriptors, and the like. Accordingly, a collection of visual words (i.e., a vocabulary) can provide information about a respective video content item and the content contained therein. The vocabulary can enable the use of standard text search and retrieval techniques for video retrieval.

In step 306, the feature descriptors for respective feature points of each frame (or scene) are correlated amongst each other. Accordingly, the features are correlated into respective groups having similar feature descriptors. For example, location data associated with a scene or set of video frames can be used to correlate for movies (or video content items) that take place in a same location (e.g., movies that take place in Paris, France), correlate for movies that look similar or correlate for movies in any way the image matching system configures the movies to be similar. The correlated visual words are stored in index 307 based on those groups. Accordingly, index 307 of correlated visual words can be made available for image matching with a query image from a user. In this respect, the user can point a portable computing device, e.g., the computing device 156 of FIG. 1B, capture an image of an item (e.g., an object, person or location), and the user can find out how one or more videos relate to the captured image such that the user can determine that the object represented in the image is featured in certain movies or television programs.

Figure 4:
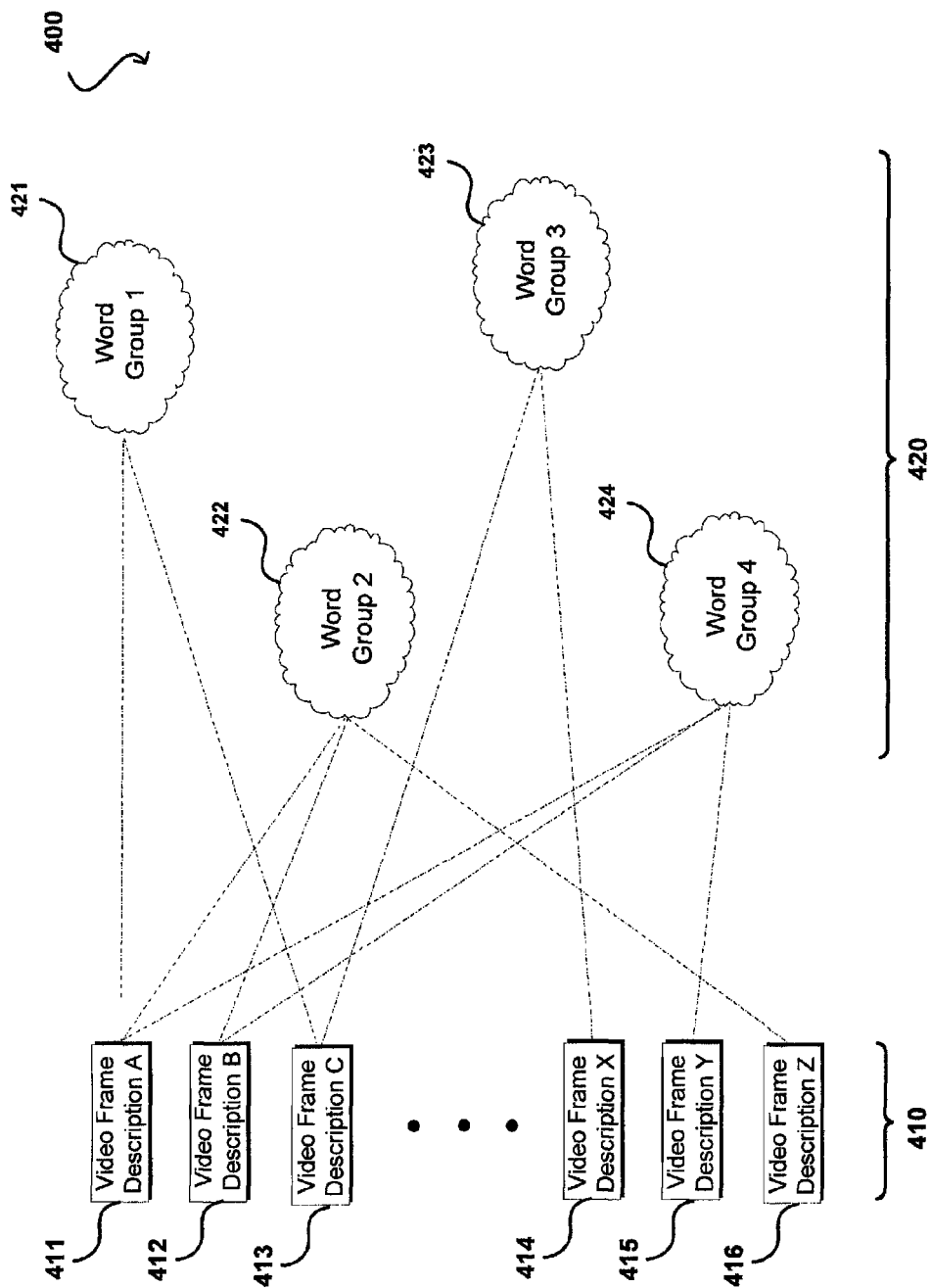
FIG. 4 illustrates an example of a correlation index, according to certain aspects of the subject technology.

FIG. 4 illustrates an example representation of a correlation index 400 according to at least one embodiment. The correlation index 400 represents a computer video defined group library 420 comprised of groupings having similar (or matching) feature descriptors for corresponding video library 410. In this respect, the correlation index 400 includes a correlation output that is a subset of a first index (e.g., the feature descriptors index) to further refine the front end of the search, and have the image matching system compare a query image against the subset of the first index for faster processing. In some aspects, a single word group corresponds to multiple video frame descriptions based at least in part upon a number of feature points included in the video frame that correspond to respective word groups. In this example, the word groups are defined as non-human readable descriptors that are primarily handled by the computer vision algorithms. In some aspects, the word groups may be defined as human-readable descriptors such that each of the groups is manually labeled by users of the image matching system. For example, each of the word groups belonging to the correlation index may be searched against the query image based on a text entry from a user of a client computing device (e.g., the computing device 156 of FIG. 1B).

In FIG. 4, video library 410 correlates to group library 420. In this example, the group library 420 comprises non-human readable descriptors that correspond to one or more video frame descriptors (or sub-regions of an image). For example, video frame description 411 (e.g., Video Frame Description A) that relates to an action/adventure film can feature items that correspond to word group 421 (e.g., abstract description of bridges), word group 422 (e.g., abstract description of red sports cars) and word group 424 (e.g., abstract description of New York City). In this example, a user may request a video that includes one or more scenes where a red sports car travels across the Brooklyn Bridge in New York City, and the user may supply images of a red sports car, the Brooklyn Bridge and New York City to perform the video search. In another example, video frame description 413 (e.g., Video Frame Description C) that relates to a foreign-made film can feature items that correspond to word group 421 and word group 423 (e.g., abstract description of Paris). The word group 422 may include correlated descriptors that correspond to video frame descriptions 411, 412 (e.g., Video Frame Description B) and 416 (e.g., Video Frame Description Z). The word group 423 may include correlated descriptors that correspond to video frame descriptions 413 and 414 (e.g., Video Frame Description X). The word group 424 may include correlated descriptors that correspond to video frame descriptions 411, 412 and 415 (e.g., Video Frame Description Y).

In some aspects, for a television program series, common groups can be extracted and the extracted groups can be applied to the series such that certain individual episodes of the series correspond to additional groups. For example, in a television program series that usually takes place in New York City but has a special episode that takes place in San Francisco, the special episode would have additional associated feature descriptors as opposed to the remaining episodes of the series.

Figure 5:
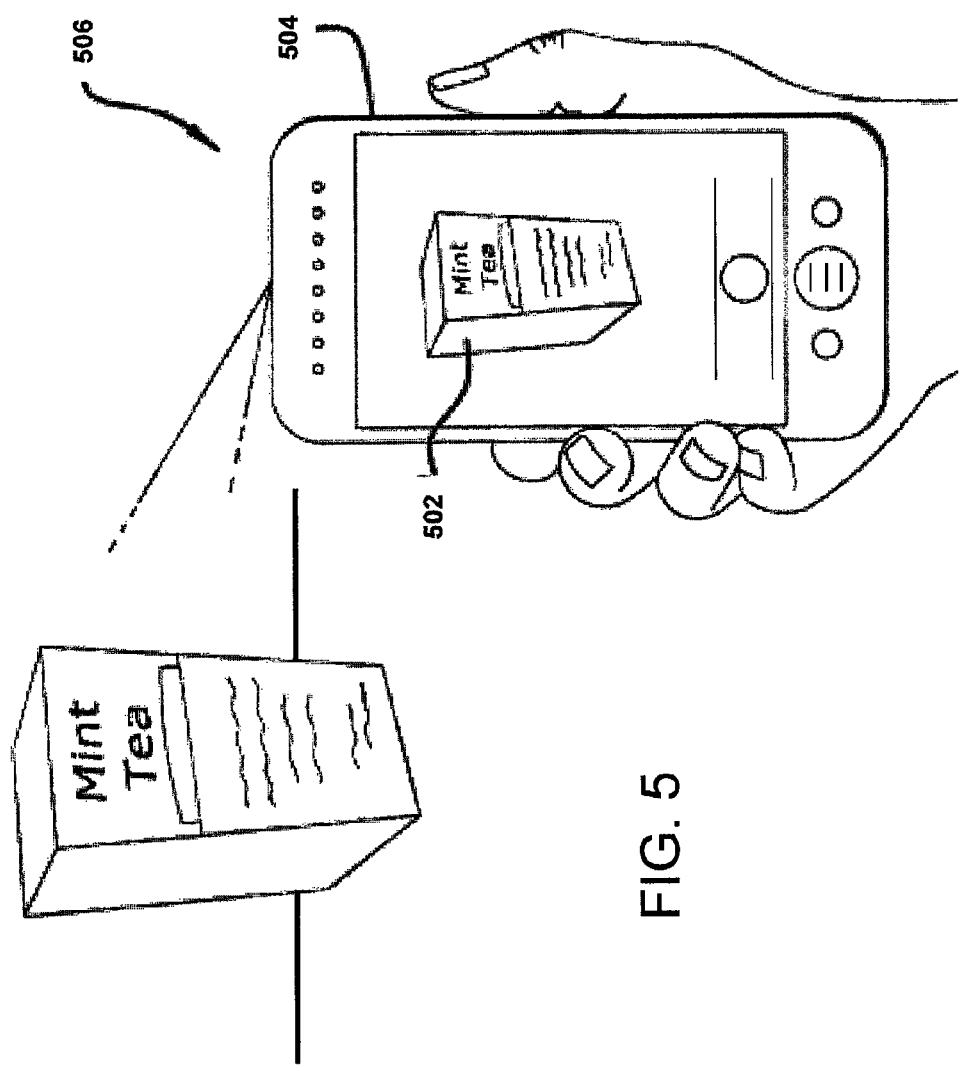
FIG. 5 illustrates another example of a user capturing an image of an item with a computing device to submit as a query image, according to certain aspects of the subject technology.
Figure 6:
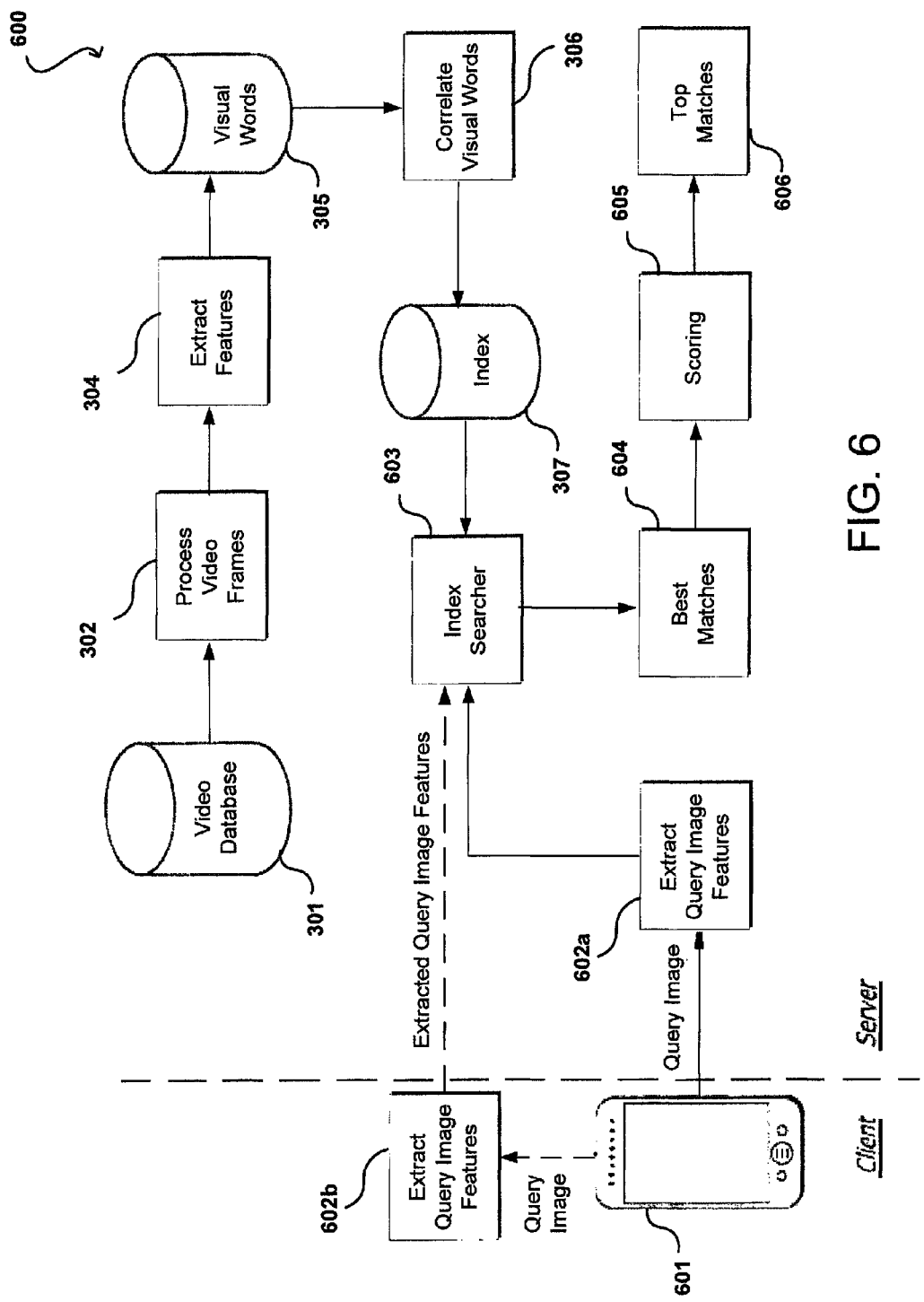
FIG. 6 illustrates an example run-time flow through an image match based video search system, according to certain aspects of the subject technology.

FIG. 5 illustrates example situation 500 wherein a user is capturing an image of a box of mint tea 502 with computing device 504 to submit the same as a query image. Upon capturing an image of the box of mint tea 502, the user can send the query image, or one or more query images can be automatically sent by computing device 504, to an image matching system, as shown in FIG. 6. Accordingly, FIG. 6 illustrates an example run-time process system flow 600 of the image matching system discussed above with respect to FIG. 3.

In this example, computing device 601, e.g., the computing device 504 as shown in FIG. 5, sends the query image to the image matching system where, upon receiving the query image, the system extracts query image features 602a and calculates query features descriptors from the same using a suitable feature extraction algorithm, as similarly discussed above. Alternatively, the computing device 601 can extract the query image features 602b locally using a local feature extraction algorithm. In turn, the computing device 601 can send the extracted query image features 602b to the image matching system. In this respect, the system can calculate query feature descriptors for the received extracted query features. In an aspect, the extracted query image features 602b may be pushed to or pulled by the image matching system based on one or more of a periodic basis, aperiodic basis, a scheduled basis or a non-scheduled basis. In some embodiments, the extracted query image features 602b are communicated to the image matching system using one or more communication protocols. In an aspect, the extracted query image features 602b are sent from a memory of the computing device 601.

The computing device 601 can provide to the image matching system a continuous set of video frames. In this respect, the computing device 601 can keep track of the relative time differences for the frames, and the computing device 601 also can keep track of past timestamps corresponding to the video frames to improve both the precision and recall function of the image matching system. As such, the extracted query features 602b may include timestamp information that enables the image matching system to compare the query features against the index 307 for temporal consistency.

After the features are extracted, visual words may be assigned to corresponding feature descriptors. The visual words are then compared against index 307 (e.g., correlated index) by index searcher 603 to identify or extract the best image matches 604. In this respect, the index searcher 603 can perform both a spatial and a temporal matching based on the visual content of each matched feature descriptor. When retrieving matching images, each query visual word votes on corresponding matched images and a ranking metric increases proportionally to the number of matching visual words. Accordingly, the matched images can be ranked by the sum of their respective weighted votes (e.g., scoring 605). In turn, the image matching system can supply the top ten best matches 606 to the end user of the computing device 601.

In some aspects, the image matching system can be implemented in a continuous scan mode. For example, the computing device 601 can constantly query the server whenever the client device provides a query image where the query image can be captured in an automated fashion. In this respect, an image matching application running on the computing device includes a viewfinder, and the computing device can constantly analyze a candidate query image to determine if the candidate query image is interesting enough to send to the server. In turn, the computing device then sends the query image to the server, the server determines if there is a match with the query image, and the server provides results to the end user at the computing device. In this example, the computing device 601 can keep track of the time differences for one or more query images to provide temporal consistency among the continuous stream of query images.

In an aspect, the image matching system can accept multiple query images. As such, the image matching system processes both query images to determine the feature descriptors of each image, then finds the intersection of those feature descriptors. Alternatively, the image matching system can process the two query images, and return the resulting correlated groups for one query image, both query images, or a combination thereof. For example, the user desires to watch a movie where one of the scenes in the movie includes a red sports car travelling through the Golden Gate Bridge, and the user obtains query images of the red sports car and the bridge, as separate images, and feeds the query images to system to refine the video search. In this respect, the image matching system would process step 602 (multiple times) and step 603 (multiple times), and the image matching system would include an additional step 604', where the image matching system combines the two results based at least in part upon the intersection of the two sets of feature descriptors.

Figure 7:
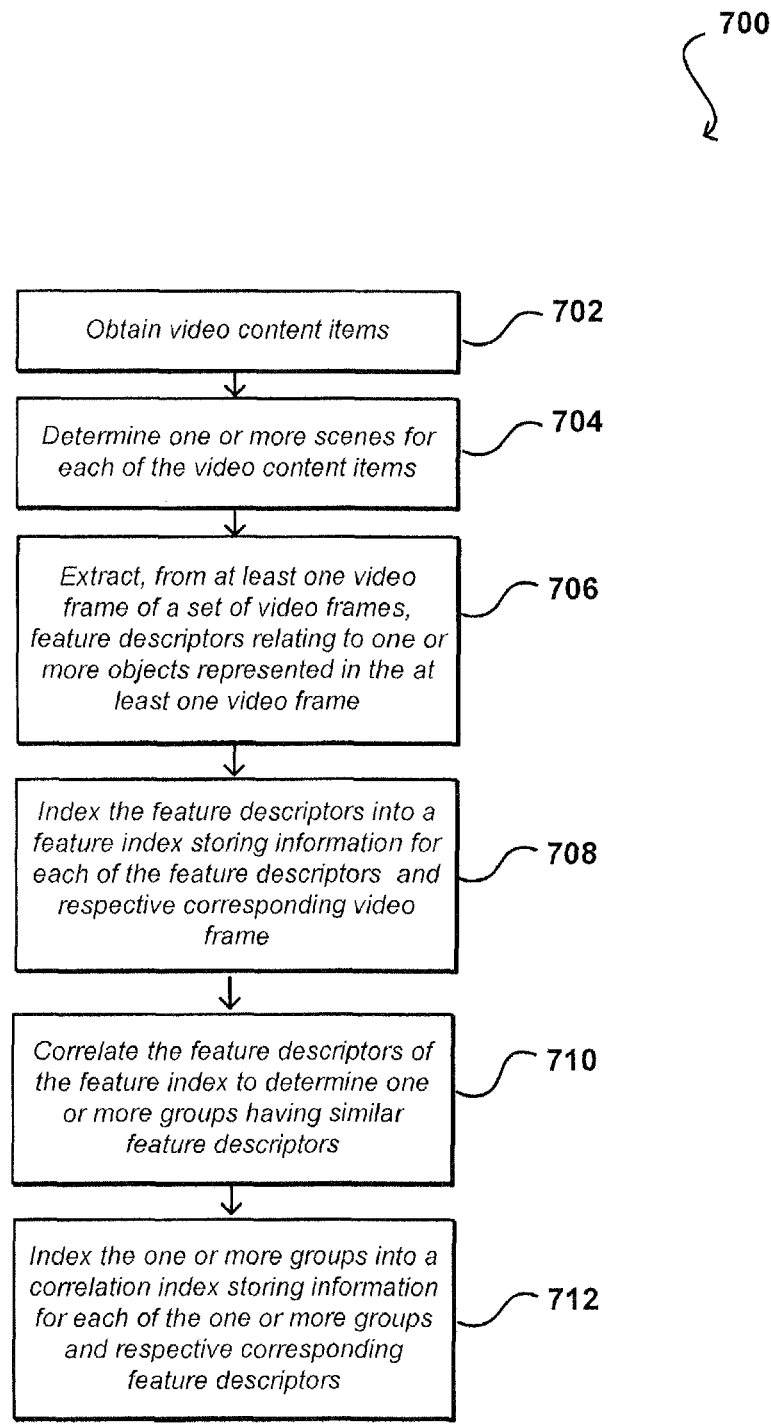
FIGS. 7 and 8 illustrate flow charts of example processes for image match based video search on a computing device, according to certain aspects of the subject technology.

FIG. 7 illustrates an example process 700 for image match based video search on a computing device, e.g., the computing device 100, as described in reference to FIG. 1, in accordance with various embodiments. It should be understood that, for this and other processes discussed herein, there can be additional, fewer, or alternative steps, performed in similar or alternative steps, or in parallel, within the scope of the various embodiments unless otherwise stated.

In this example, a system providing an image matching service can obtain multiple video content items 702. The system may be associated with an online video streaming service and the video content items could be products available for retrieval therefrom.

In this example, the system can determine one or more scenes for each of the video content items 704. The scenes may be determined by first determining scene boundaries comprised of a set of video frames such as first, middle and end frames. In an aspect, the set of video frames may be comprised of only one video frame (e.g., the middle frame). Each of the frames includes one or more objects (e.g., people, product, location). Each of the objects includes one or more features.

In this example, the system can extract features from at least one video frame of the set of video frames included in a scene using a feature extraction algorithm (e.g., Harris Corner Detector algorithm) and transform the same into their feature descriptor representations 706. The feature descriptors may relate to one or more objects represented in the at least one video frame. In some aspects, the system can extract video descriptors. In this example, the video descriptors relate to video features extracted from a number of consecutive frames for a video that represent information of the consecutive video frames. For example, a camera panning over an object accumulates information across multiple consecutive frames such that the set of descriptors corresponding to the consecutive frames may not be any descriptor from one of the consecutive frames. Rather, the video descriptor may be a consolidated descriptor that is stored and includes information from a representation of the consecutive frames together.

The system can index the feature descriptors into a feature index and store them with information for each of the feature descriptors and respective corresponding video frame 708. In turn, the system can correlate the feature descriptors of the feature index to determine one or more groups having similar feature descriptors 710. In some aspects, the system can correlate the feature descriptors based on grouping items that are similar, grouping items that are not similar and/or ensuring not to group items that are not similar. The system can then index the one or more groups into a correlation index storing information for each of the one or more groups and respective corresponding feature descriptors 712. The correlation index can be subsequently stored and used to compare against query images submitted by users.

Figure 8:
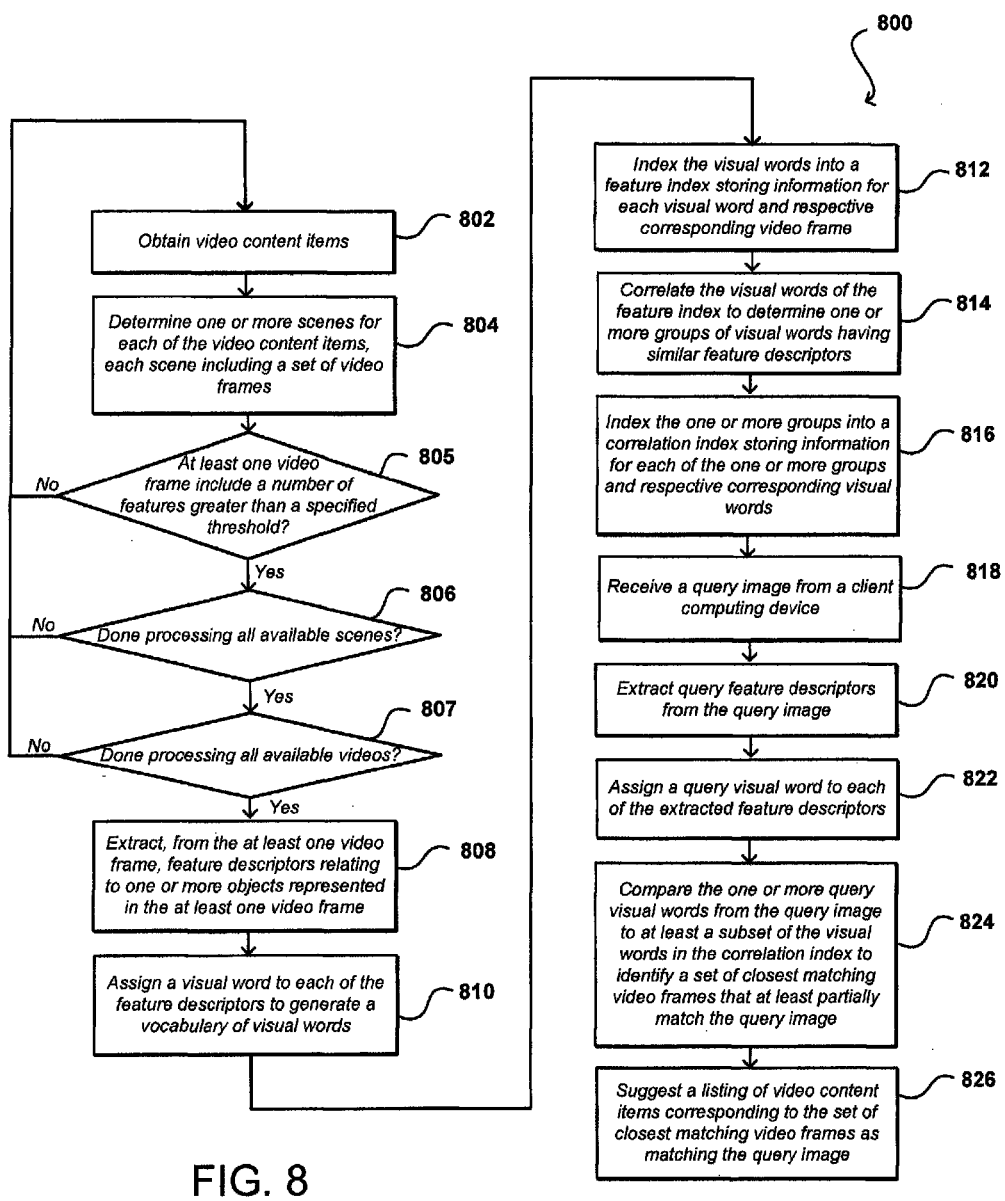

FIG. 8 illustrates an example process 800 for image match based video search on a computing device, e.g., the computing device 100, as described in reference to FIG. 1, in accordance with various embodiments. It should be understood that, for this and other processes discussed herein, there can be additional, fewer, or alternative steps, performed in similar or alternative steps, or in parallel, within the scope of the various embodiments unless otherwise stated.

In this example, a system providing an image matching service can obtain multiple video content items 802. The system may be associated with an online video streaming service and the video content items could be products available for retrieval therefrom. In this example, the system can determine one or more scenes for each of the video content items 804. Each of the scenes may be comprised of a set of video frames such as first, middle and end frames. Each of the frames includes one or more objects (e.g., people, product, location). Each of the objects includes one or more features.

The system can determine whether each of the frames (or at least one video frame) includes a number of features that is greater than a specified threshold 805. The specified threshold may correspond to a condition for using a feature extraction algorithm. The specified threshold can be an absolute threshold or a relative threshold. For example, the absolute threshold can correspond to an average contrast value (e.g., approximately 24 gray values). The relative threshold may relate to where to select a frame between two consecutive frames (e.g., frame x followed by frame y). In these examples, the specified threshold may correspond to the quality of the video frame such that frames of a certain quality can be processed. If the specified threshold is not satisfied, the system can return to step 802 and obtain a next set of video content items. Otherwise, the system proceeds with determining if all available scenes pertaining to the video have been processed 806. If so, the system proceeds with determining if all available videos have been processed 807. Otherwise, the system proceeds from steps 806 or 807 back to step 802. In turn, the system proceeds with extracting the features from the frame at step 808.

In this example, the system can extract features relating to one or more objects represented in at least one video frame using a feature extraction algorithm (e.g., Harris Corner Detector algorithm) and transform the same into their feature descriptor representations 808. The system can then assign a visual word to each of the feature descriptors to generate a vocabulary of visual words describing the one or more features of each respective object represented in the at least one video frame 810.

The system can index the visual words into a feature index and store them with information for each of the visual words and respective corresponding video frame 812. In turn, the system correlates the visual words of the feature index to determine one or more groups having similar feature descriptors 814. The system can then index the one or more groups into a correlation index storing information for each of the one or more groups and respective corresponding visual words 816.

The system can receive a query image from a client computing device 818. In this respect, a user of the client computing device may capture a live image of an object (e.g., person, location, product) to determine one or more movies and/or television programs that relate to the captured image. In an aspect, the query image may include an image of an object as the object represented in the query image (e.g., the user captures an image of an advertisement featuring a red car).

The system can extract query feature descriptors from the query image 820. In turn, the system assigns a query visual word to each of the extracted feature descriptors 822. In this example, the system compares the one or more query visual words from the query image to at least a subset of the visual words in the correlation index to identify a set of closest matching video frames that at least partially match the query image based at least in part upon a respective number of query visual words matching a respective number of visual words in the correlation index 824. In some aspects, step 824 includes a temporal comparison to provide temporal consistency between the compared featured descriptors. The system further can suggest a listing of video content items corresponding to the set of closest matching video frames as matching the query image 826.

In an aspect, both spatial and temporal consistency may be provided during the comparison if a subsequent frame of the frame being compared is determined to be part of the same video. In this respect, an expected frame may be checked irrespective of the correlation index. For example, in a particular video (or movie), a determination from a first frame that an event in the movie took place, and after some elapsed amount of time, another determination is made that a second frame subsequent to the first frame relates to an expected point in the movie. If the subsequent frame does not relate to the expected frame, then a different type of image search can be performed. In this respect, the comparison with the expected frame allows the image match system to be more robust and/or improves the signal quality of prior video frame comparisons.

Figure 9:
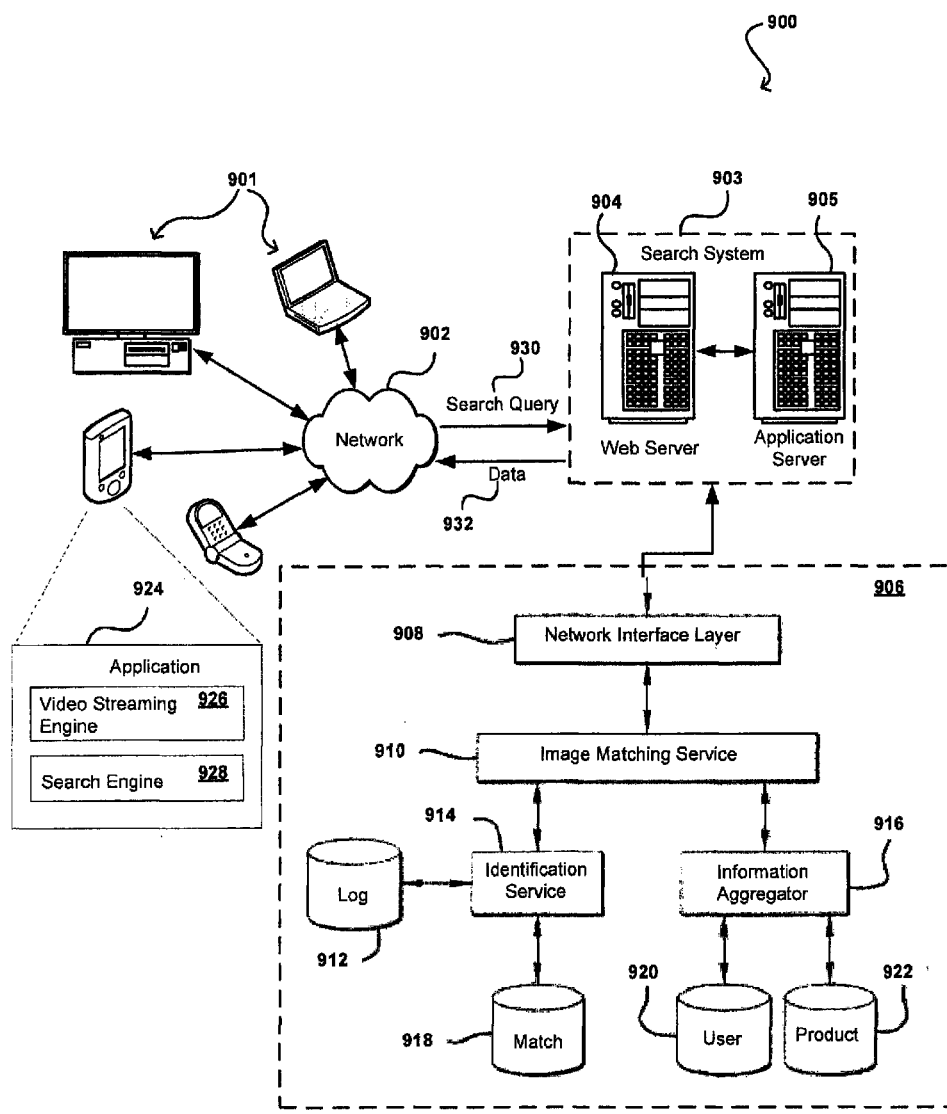
FIG. 9 illustrates an example of an environment for implementing aspects in accordance with various embodiments of the subject technology.

FIG. 9 illustrates an example of an environment 900 for implementing aspects in accordance with various embodiments. Although a web-based environment is described for purposes of explanation, different environments may be used, as appropriate, to implement various embodiments.

The example environment 900 includes a search system 903 and a content provider 906. The search system 903 includes at least one web server 904 and at least one application server 905, as described below. The search system 903 is an example of an interactive video content retrieval system implemented as computer programs on one or more computers in one or more locations, in which the systems, components, and techniques described below can be implemented.

A user can interact with the search system 903 through a client device 901. For example, the client device 901 can be a computer coupled to the search system 903 through a data communication network 902, e.g., the Internet. In some instances, the search system 903 can be implemented on the client device 901, for example, through a software application executing on the client device 901. The client device 901 generally includes a memory, e.g., a random access memory (RAM), for storing instructions and data, and a processor for executing stored instructions. The client device 901 can be any appropriate device operable to send and receive requests, messages, or other types of information over the network 902. The client device 901 can also include a display screen though which a user interacting with the client device can view information, e.g., video streaming service. Some examples of client devices include personal computers, cellular phones, handheld messaging devices, laptop computers, set-top boxes, personal data assistants, electronic book readers, tablet devices, and the like.

The network 902 can include any appropriate network, including an intranet, the Internet, a cellular network, a local area network, a wide area network, or any other such network, or combination thereof. Components used for such a system can depend at least in part upon the type of network, the environment selected, or both. Protocols and components for communicating over such a network are well known and will not be discussed herein in detail. The client device 901 can communicate over the network using wired or wireless connections, and combinations thereof.

A user can use the client device 902 to submit a search query 930 to the search system 903. The search query 930 can request one or more movies identified as video content items of a video library hosted by the video streaming service, and identified using a query image obtained at the client device 902 that relates to one or more items featured in the movie. When the user submits the search query 930, the search query 930 may be transmitted through the network 902 to a server 904 within the search system 903. The server 904 responds to the query 930 by using, for example, the image matching service 910, to identify data 932 describing a listing of video content items that satisfies the search query 930. The server 904, in communication with the content provider 906, sends the data 932 through the network 902 to the client device 901 for presentation to the user.

In this example, the search query 930 is received at a network interface layer 908 of the content provider 906, via the web server 904 and/or the application server 905 of the search system 903. The network interface layer 908 can include any appropriate components known or used to receive requests from across the network 902, such as may include one or more application programming interfaces (APIs) or other such interfaces for receiving such requests. The network interface layer 908 might be owned and operated by the content provider 906, or leveraged by the content provider 906 as part of a shared resource or "cloud" offering. The network interface layer 908 can receive and analyze the search query 930, and cause at least a portion of the information in the search query 930 to be directed to an appropriate system or service, such as the image matching service 910. The image matching service 910 in this example may include components operable to receive color data for a type of item, audio fingerprint for the type of item, lighting data for the type of item. In turn, the image matching service 910 can analyze at least one of the aforementioned types of data for sets of video frames for the video. Further, the system may also accept query images relating to people, products, places, or things that can yield information of video content items that relate to such query image.

The image matching service 910 in this example can cause information to be sent to at least one identification service 914, device, system, or module that is operable to analyze the correlated descriptor data and attempt to locate one or more matches. In at least some embodiments, an identification service 914 will process the received data, such as to extract feature points, correlate the feature points to create groups, and then compare the groups stored in a matching data store 918 or other such location. The data in an image matching data store 918 might be indexed and/or processed to facilitate with matching, as is known for such purposes.

The image matching service 910 can receive information from each contacted identification service 914 as to whether one or more matches could be found with at least a threshold level of confidence, for example, and can receive any appropriate information for a located potential match. The information from each identification service can be analyzed and/or processed by one or more applications of the image matching service, such as to determine data useful in obtaining information for each of the potential matches or products to provide to the user. For example, the image matching service 910 might receive bar codes, product identifiers, or any other types of data from the identification service 914, and might process that data to be provided to a service such as an information aggregator service 916 that is capable of locating descriptions or other content related to the located potential matches. In an aspect, the information aggregator service 916 may support both spatial and temporal matching if no client computing device is involved with the image matching service 910.

In at least some embodiments, the information aggregator 916 may be associated with an entity that provides an electronic marketplace, or otherwise provides items or content for consumption (e.g., purchase, rent, lease, or download) by various customers. Although products and electronic commerce are presented in this and other examples presented, it should be understood that these are merely examples and that approaches presented in the present disclosure can relate to any appropriate types of objects or information as discussed and suggested elsewhere herein. In such an instance, the information aggregator service 916 can utilize the aggregated data from the image matching service 910 to attempt to locate products, in a product data store 922 or other such location, which are offered through the marketplace and that match, or are otherwise related to, the potential match information. For example, if the identification service identifies a type of movie with the desired item (e.g., product, location, person), the information aggregator can attempt to determine whether instances of that movie are offered through the marketplace, or at least for which information is available through the marketplace. In at least some embodiments, the information aggregator can utilize one or more suggestion algorithms or other such approaches to attempt to determine related elements that might be of interest based on the determined matches. In some embodiments, the information aggregator can return various types of data (or metadata) to the environmental information service, as may include item description, availability, reviews, and the like. In other embodiments, the information aggregator might instead return information such as a product identifier, uniform resource locator (URL), or other such digital entity enabling a browser or other interface on the computing device 901 to obtain information for one or more products, etc. The information aggregator can also utilize the aggregated data to obtain various other types of data as well. Information for located matches also can be stored in a user data store 920 of other such location, which can be used to assist in determining future potential matches or suggestions that might be of interest to the user. Various other types of information can be returned as well within the scope of the various embodiments.

The image matching service 910 can bundle at least a portion of the information for the potential matches to send to the client as part of one or more messages or responses to the original request. In some embodiments, the information from the identification services might arrive at different times, as different types of information might take longer to analyze, etc. In these cases, the matching service might send multiple messages to the client device 901 as the information becomes available. The potential matches located by the various identification services can be written to a log data store 912 or other such location in order to assist with future matches or suggestions, as well as to help rate a performance of a given identification service. As should be understood, each service can include one or more computing components, such as at least one server, as well as other components known for providing services, as may include one or more APIs, data storage, and other appropriate hardware and software components. It should be understood that, although the identification services are shown to be part of the provider environment 906 in FIG. 9, that one or more of these identification services might be operated by third parties that offer these services to the content provider 906.

The data 932 can include data describing a particular movie or television program. The data 932 can be used, for example, by a client device 901, to generate a listing of video content items to be displayed to the user on the client device 901, and enable the user to select one or more items to watch.

After receiving the data 932 from the server 904, and through the network 902, a software application, e.g., web browser or application 924, running on the client device 901 renders a video streaming service for the requested featured movie item using the data 932. For example, a video streaming engine 926 in the application 924 can describe the requested item as a featured item in a desired movie, for display on a display screen of the client device 901. In some embodiments, the application 924 includes a search engine 928 that is configured to generate and send the search query 930 to search for video content using image match based video search.

In some embodiments, the web server 904, server 905, and similar components, can be considered to be part of the content provider 906. The handling of all requests and responses, as well as the delivery of content between the client device 901 and the server 905, can be handled by the web server 904. The web server 904 and server 905 are merely example components. However, more or fewer components can be used as structured code can be executed on any appropriate device or host machine as discussed elsewhere herein.

The content provider 906 includes one or more resources, servers, hosts, instances, routers, switches, data stores, other similar components, or a combination thereof. The resources of the content provider 906 are not limited to storing and providing access to data. Indeed, there may be several servers, layers, or other elements, processes, or components, which may be chained or otherwise configured, and which can interact to perform tasks including, for example, obtaining data from an appropriate data store. In some embodiments, the term "data store" refers to any device or combination of devices capable of storing, accessing, and retrieving data, which may include any combination and number of data servers, databases, data storage devices, and data storage media, in any standard, distributed, or clustered environment.

The data stores of the content provider 906 can include several separate data tables, databases, or other data storage mechanisms and media for storing data relating to a particular aspect. For example, the content provider 906 illustrated includes mechanisms for storing video content items and user information 920, which can be used to serve content. The content provider 906 is also shown to include a mechanism for storing log data 912, which can be used for purposes such as reporting and analysis. The content provider 906 is operable, through logic associated therewith, to receive instructions from the server 905 and to obtain, update, or otherwise process data, instructions, or other such information in response thereto, as described above.

Each server typically includes an operating system that provides executable program instructions for the general administration and operation of that server, and typically will include a computer-readable medium storing instructions that, when executed by a processor of the server, enable the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment including several computer systems and components that are interconnected through one or more communication links, using one or more computer networks or direct connections. However, the system described above can be configured to operate equally well using fewer or a greater number of components than are illustrated in FIG. 9. Thus, the system 900 in FIG. 9 is provided merely as one example, and does not limit the scope of the disclosure.

Figures 10A, 10B:
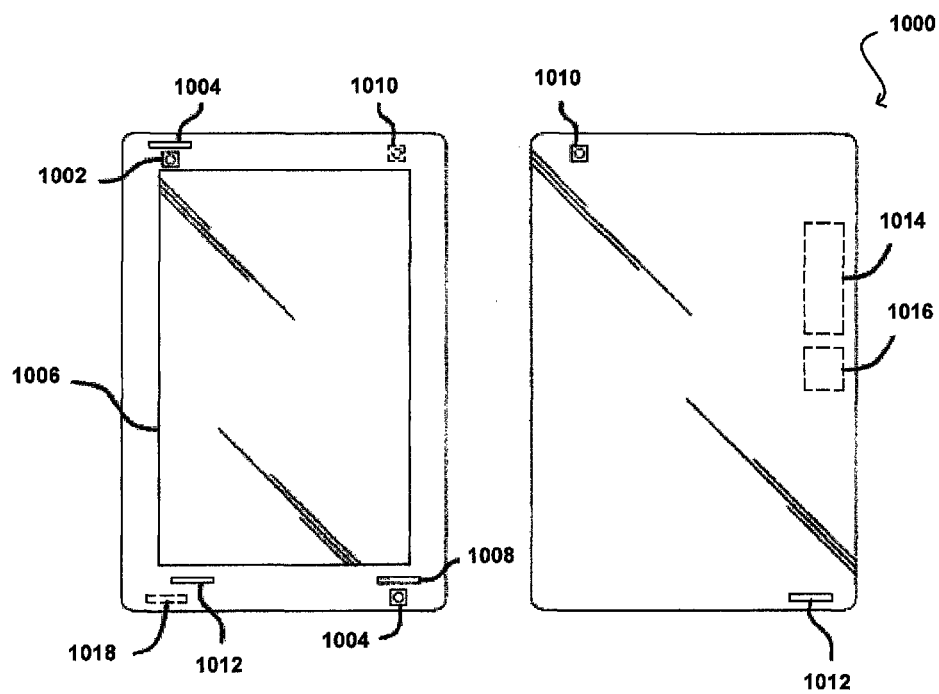
FIGS. 10A-B illustrate front and back views of an example computing device, according to certain aspects of the subject technology.

FIGS. 10A-B illustrate front and back views, respectively, of an example computing device 1000 that can be used to perform approaches described in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 1000 has a display screen 1002 (e.g., an LCD element) operable to display information or image content to one or more users or viewers of the device. The display screen of some embodiments displays information to the viewer's facing the display screen (e.g., on the same side of the computing device as the display screen). The computing device in this example can include one or more imaging elements, in this example including two image capture elements 1004 on the front of the device and at least one image capture element 1010 on the back of the device. It should be understood, however, that image capture elements could also, or alternatively, be placed on the sides or corners of the device, and that there can be any appropriate number of capture elements of similar or different types. Each image capture element 1004 and 1010 may be, for example, a camera, a charge-coupled element (CCD), a motion detection sensor or an infrared sensor, or other image capturing technology.

As discussed, the device can use the images (e.g., still or video) captured from the imaging elements 1004 and 1010 to generate a three-dimensional simulation of the surrounding environment (e.g., a virtual reality of the surrounding environment for display on the display element of the device). Further, the device can utilize outputs from at least one of the image capture elements 1004 and 1010 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 1008 on the front side, one microphone 1012 on the back, and one microphone 1006 on or near a top or side of the device. In some devices there may be only one microphone, while in other devices there might be at least one microphone on each side and/or corner of the device, or in other appropriate locations.

The device 1000 in this example also includes one or more orientation- or position-determining elements 1018 operable to provide information such as a position, direction, motion, or orientation of the device. These elements can include, for example, accelerometers, inertial sensors, electronic gyroscopes, and electronic compasses.

The example device also includes at least one communication mechanism 1014, such as may include at least one wired or wireless component operable to communicate with one or more electronic or computing devices. The device also includes a power system 1016, such as may include a battery operable to be recharged through conventional plug-in approaches, or through other approaches such as capacitive charging through proximity with a power mat or other such element. Various other elements and/or combinations are possible as well within the scope of various embodiments.

Figure 11:
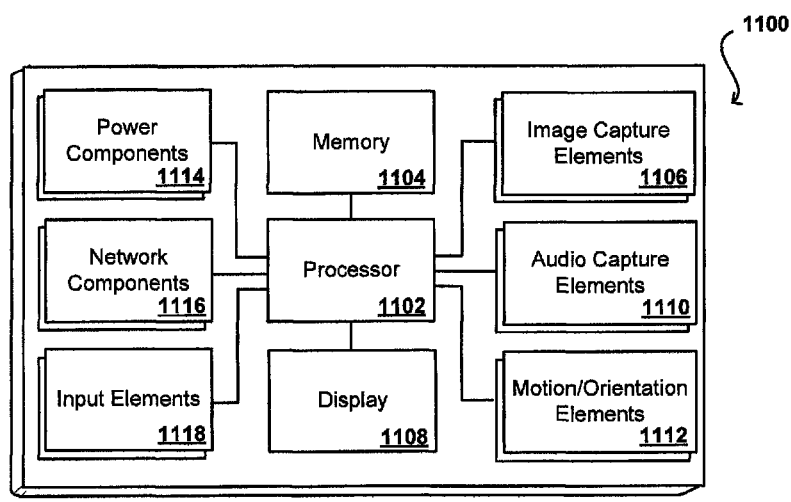
FIG. 11 illustrates an example configuration of components of a computing device, according to certain aspects of the subject technology.

FIG. 11 illustrates a logical arrangement of a set of general components of an example computing device 1100. In this example, the device includes a processor 1102 for executing instructions that can be stored in a memory device or element 1104. As would be apparent to one of ordinary skill in the art, the device can include many types of memory, data storage, or non-transitory computer-readable storage media, such as a first data storage for program instructions for execution by the processor 1102, a separate storage for images or data, a removable memory for sharing information with other devices, etc. The device typically will include some type of display element 1106, such as a touch screen or liquid crystal display (LCD), although devices such as portable media players might convey information via other means, such as through audio speakers. As discussed, the device in many embodiments will include at least one image capture element 1108 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 1110, such as a mono or stereo microphone or microphone array, operable to capture audio information from at least one primary direction. A microphone can be a uni- or omni-directional microphone as known for such devices.

In some embodiments, the computing device 1100 of FIG. 11 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 1100 also can include at least one orientation or motion sensor 1112. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as elements that enable location determinations through triangulation or another such approach. These mechanisms can communicate with the processor 1102, whereby the device can perform any of a number of actions described or suggested herein.

As an example, a computing device can capture and/or track various pieces of information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

The various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business map servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device comprising:
   at least one processor; and
   memory storing instructions that, when executed by the at least one processor, cause a computing device to perform operations, comprising:
   obtaining a video content item;
   determining a plurality of scenes for the video content item, the plurality of scenes including a respective set of video frames;
   determining that at least one video frame of the respective set of video frames for a scene includes a number of features for extraction that is greater than a specified threshold;
   extracting, from the at least one video frame, a plurality of feature descriptors relating to an object represented in the at least one video frame, the object including one or more features;

assigning a visual word to each of the plurality of feature descriptors to generate a vocabulary of visual words describing the one or more features;
indexing the visual words into a feature index storing information for the visual words;
correlating the visual words of the feature index to determine one or more groups of visual words having similar feature descriptors;
indexing the one or more groups into a correlation index storing information for the one or more groups and respective corresponding visual words;
receiving a query image from a client computing device;
extracting query feature descriptors from the query image to determine extracted query feature descriptors;
assigning a query visual word to each of the extracted query feature descriptors;
comparing one or more of the query visual words from the query image to at least a subset of the visual words in the correlation index to identify a set of closest matching video frames that at least partially match the query image based at least in part on a respective number of query visual words matching a respective number of visual words in the correlation index; and
generating a recommendation for one or more video content items corresponding to the set of closest matching video frames as matching the query image.

2. The computing device of claim 1, the instructions causing the computing device to perform further operations comprising:
determining at least one scene boundary for each of the plurality of scenes, the at least one scene boundary including a start frame, an end frame, and a middle frame between the start frame and the end frame.

3. The computing device of claim 1, the instructions causing the computing device to perform further operations comprising:
processing each of the plurality of scenes to extract the plurality of feature descriptors for each frame of a corresponding video content item.

4. The computing device of claim 1, the instructions causing the computing device to perform further operations comprising:
processing each of the plurality of scenes to extract the plurality of feature descriptors for a random sample of frames of a corresponding video content item.

5. The computing device of claim 1, the instructions causing the computing device to perform further operations comprising:
enabling the one or more groups of the correlation index to be searched against the query image based at least in part on a text entry from a user of the client computing device.

6. A computer-implemented method, comprising:
obtain a video content item;
determine a scene for the video content item, the scene including a set of video frames;
extract, from a video frame of the set of video frames, a plurality of feature descriptors relating to a object represented in the video frame, the object associated with one or more features;
index the plurality of feature descriptors into a feature index storing information for the plurality of feature descriptors for the video frame;
correlate the plurality of feature descriptors of the feature index to determine one or more groups having similar feature descriptors;
index the one or more groups having similar feature descriptors into a correlation index storing information for the one or more groups and respective corresponding feature descriptors;
obtaining query feature descriptors of a query image;
comparing one or more of the query feature descriptors to at least a subset of the correlation index to identify a set of closest matching video frames that at least partially match the query image based at least in part on a respective number of query feature descriptors matching a respective number of feature descriptors in the correlation index; and
providing information relating to one or more video content items corresponding to the set of closest matching video frames as matching the query image.

7. The computer-implemented method of claim 6, further comprising:
determining one or more scenes for each of a plurality of video content items, each of the one or more scenes including a set of video frames;
determining that at least one video frame of the set of video frames has a number of features for extraction that is greater than a specified threshold;
extracting, from the at least one video frame, a plurality of feature descriptors relating to one or more objects represented in the at least one video frame, each of the one or more objects including one or more features;
assigning a visual word to each of the plurality of feature descriptors to generate a vocabulary of visual words describing the one or more features of each respective object represented in the at least one video frame;
indexing the visual words into a feature index storing information for each visual word and respective corresponding video frame; and
correlating the visual words of the feature index into the correlation index to determine one or more groups of visual words having similar feature descriptors.

8. The computer-implemented method of claim 7, wherein the determining of the one or more scenes comprises determining at least one scene boundary for each of the one or more scenes, the at least one scene boundary including a start frame, an end frame, and a middle frame between the start frame and the end frame.

9. The computer-implemented method of claim 7, wherein each of the plurality of video content items are processed to extract the plurality of feature descriptors for each frame of a corresponding video content item of the plurality of video content items.

10. The computer-implemented method of claim 7, wherein each of the plurality of video content items are processed to extract the plurality of feature descriptors for a random sample of frames of a corresponding video content item of the plurality of video content items.

11. The computer-implemented method of claim 6, wherein obtaining the query feature descriptors of the query image comprises:
receiving the query feature descriptors including corresponding timestamp information from a client computing device, the query feature descriptors extracted from the query image at the client computing device.

12. The computer-implemented method of claim 6, wherein obtaining the query feature descriptors of the query image comprises:
receiving the query image from a client computing device; and
extracting the query feature descriptors from the query image.

13. The computer-implemented method of claim 6, further comprising:
assigning a query visual word to query feature descriptors of the query image to generate assigned visual words; and
searching, using the assigned visual words of the query image, the correlation index to identify the set of closest matching video frames that at least partially match the query image, wherein each of the assigned visual words corresponds to a feature of a video frame of at least one video content item of a plurality of video content items.

14. The computer-implemented method of claim 6, wherein the one or more groups having similar feature descriptors included in the correlation index correspond to a subset of feature descriptors extracted from a plurality of video content items.

15. The computer-implemented method of claim 6, further comprising:
determining a matching score between the query image and the set of closest matching video frames, wherein the matching score is based at least in part on a similarity between feature descriptors of the query image and corresponding feature descriptors of the set of closest matching video frames.

16. A non-transitory computer readable storage medium storing instructions for image match based video search on a computing device, the instructions when executed by a processor causing the processor to:
obtain a video content item;
determine a plurality of scenes for the video content item, the plurality of scenes including a respective set of video frames, the plurality of scenes determined based at least in part on at least one scene boundary being determined for the plurality of scenes, the at least one scene boundary including a start frame, an end frame, and a middle frame between the start frame and the end frame;
extract, from at least one video frame of the respective set of video frames for a scene, a plurality of feature descriptors relating to one or more objects represented in the at least one video frame, the one or more objects including one or more features;
index the plurality of feature descriptors into a feature index storing information for the plurality of feature descriptors and respective corresponding video frame;
correlate the plurality of feature descriptors of the feature index to determine one or more groups having similar feature descriptors; and
index the one or more groups into a correlation index storing information for the one or more groups and respective corresponding feature descriptors.

17. The non-transitory computer readable storage medium of claim 16, wherein the instructions, when executed by the processor, further enable the processor to:
assign a visual word to each of the plurality of feature descriptors to generate a vocabulary of visual words describing the one or more features of each respective object represented in the at least one video frame.

18. The non-transitory computer readable storage medium of claim 16, wherein the instructions, when executed by the processor, further enable the processor to:
receive a query image from a client computing device;
extract query feature descriptors from the query image;
compare one or more of the query feature descriptors from the query image to at least a subset of the correlation index to identify a set of closest matching video frames that at least partially match the query image based at least in part on a respective number of query feature descriptors matching a respective number of feature descriptors in the correlation index; and
provide information relating to one or more video content items corresponding to the set of closest matching video frames as matching the query image.

19. The non-transitory computer readable storage medium of claim 16, wherein the instructions, when executed by the processor, further enable the processor to:
determine that at least one video frame of the respective set of video frames has a number of features for extraction that is greater than a specified threshold, wherein the plurality of feature descriptors are extracted from the at least one video frame in response to the number of features is determined to be greater than the specified threshold.

* * * * *